United States Patent [19]
Southwick

[11] 3,713,774
[45] Jan. 30, 1973

[54] METHOD AND APPARATUS FOR TITRATING LIQUIDS

[76] Inventor: Samuel G. Southwick, 1501 Leland Avenue, Springfield, Sangamon County, Ill. 62704

[22] Filed: Feb. 4, 1970

[21] Appl. No.: 8,585

[52] U.S. Cl..................23/253 R, 73/425.6, 222/33
[51] Int. Cl. .......B67d 5/26, G01n 1/14, G01n 31/16
[58] Field of Search..............23/230, 253 R; 222/33; 73/425.6

[56] References Cited

UNITED STATES PATENTS 2,946,486  7/1960  Gilmont..........................73/425.6 X
3,489,520  1/1970  Chartouni et al......................23/253

OTHER PUBLICATIONS

Kateman et al., Anal. Chem. 36, No. 1, January 1964, pp. 253-254.

*Primary Examiner*—Morris O. Wolk
*Assistant Examiner*—R. M. Reese
*Attorney*—George J. Netter and Kendrick and Subkow

[57] ABSTRACT

Apparatus for dosing from a titrant reservoir and transferring or metering discrete quantities of the titrant to an unknown sample. An electric analog signal is generated in response to liquid transference representative of the amount of liquid transferred. Calibration circuits weight the analog signal to reflect titrant concentration and sample volume and thereby provide direct readout on a display means, such as a digital voltmeter for example, of a titrated sample concentration. The calibration circuits also furnish analog subtraction of the analog signal to establish direct readout of the concentration of a back-titrated sample.

6 Claims, 4 Drawing Figures

INVENTOR
SAMUEL G. SOUTHWICK
BY KENDRICK and SUBKOW
George J. Netter
ATTORNEY

INVENTOR
SAMUEL G. SOUTHWICK
BY KENDRICK and SUBKOW
George J. Netter
ATTORNEY

METHOD AND APPARATUS FOR TITRATING LIQUIDS

The present invention relates generally to dispensing liquids, and, more particularly, to method and apparatus for titrating liquids and automatically calculating titrimetric values.

BACKGROUND OF THE INVENTION

Conventional manual titrations are difficult and tedious, requiring the addition of precise quantities of known reagents to an unknown solution by such means as a pipette, for example, until a change in some chemical or physical property is detected indicating completion of the titration. Determination of the unknown solution concentration is then customarily achieved by a separate calculation step.

Typically, calculation of the concentration of an unknown samples involves solution of an equation similar to the following:

$$Cs = Ct/Vs \times Vt$$

where,
$Cs$ = unknown sample concentration,
$Ct$ = titrant concentration,
$Vs$ = sample volume,
$Vt$ = titrant volume required.

It is instructive to note that in any given titration the titrant concentration and sample volume are both known and constant. Accordingly, the ratio $Ct/Vs$ is constant for the titration, which fact is important to the practice of this invention as will be described later herein.

In certain situations, titrimetric concentration determination of an unknown sample is somewhat more complex, requiring multiple titrations, which technique is commonly referred to as back-titration. That is, the sample is added to a first known or reference solution until partial equilibration is obtained, the reference solution is titrated with a further known solution both before addition of the unknown sample, and then the reference solution with unknown sample is titrated. Calculation of the unknown concentration is required as in the case of simple titration.

Back-titration calculation can be accomplished by solving the following mathematical equation:

$$Cs = Ct/Vs \, (Vt1 - Vt2)$$

where,
$Cs$ = unknown concentration,
$Ct$ = titrant concentration,
$Vs$ = sample volume,
$Vt1$ = required titrant volume to equilibrate reference solution alone,
$Vt2$ = required titrant volume to equilibrate reference solution after unknown sample added.

Again, it is important to note that $Ct/Vs$ is constant, and therefore, the unknown concentration is directly proportional to the difference in titrant volumes.

There are known devices which can dispense precise measured amounts of liquids quickly and easily. One such device includes a hollow cylinder which contains a supply of a solution to be dispensed. A plunger or piston is selectively advanced within the cylinder bore by a micrometer screw to force the solution out of the cylinder through a small orifice. By this device a liquid titrant can be accurately dispensed or dosed in fine droplets. However, even with the use of such a device it is still necessary to manually refill it with titrant after use, reset any readout apparatus, and, of course, calculate the concentration of unknown sample.

Certain other known apparatus have applied servo techniques for end point detection in titrations. And in still other known apparatus, such as that disclosed in U. S. Pat. No. 3,143,393, "Apparatus for Automatically Performing Chemical Operations and Similar or Related Operations" by De Seguin des Hons, a photocell monitors liquid level in a pipette and positions a potentiometer to provide an analog signal indicative of amounts of liquid transferred by the system.

OBJECTS AND SUMMARY OF THE INVENTION

It is therefore a primary object and aim of this invention to provide method and apparatus for selectively dispensing liquids in discrete amounts and producing an electric signal representative of the quantity of liquid dispensed.

Another object of the invention is to provide method and apparatus for selectively dispensing liquids in discrete amounts and producing an electric signal selectively modifiable to represent the quantity dispensed of a constituent of said liquid.

A further object of the invention is the provision of method and apparatus for titrating a liquid sample and producing a selectively modifiable electric signal representative of the concentration of a constituent of the sample.

Another object of the invention is to provide method and apparatus for the dispensing of a liquid in discrete amounts and producing an electric signal selectively modifiable to represent the difference between a dispensed reference amount and any given subsequently dispensed amount.

A further object of the invention is to provide method and apparatus for dispensing a liquid in discrete amounts and producing an electric signal corresponding to the difference in quantity of a common constituent of a dispensed reference amount and that of any given subsequently dispensed amount.

A still further object of the invention is the provision of method and apparatus for back-titration of a liquid sample and production of an electric signal selectively modifiable to represent the concentration of a constituent of the sample.

Another object of the invention is to provide method and apparatus for dispensing liquids from a reservoir in which quantity dispensing monitoring means are automatically reset during refill.

Yet another object is the provision of method and apparatus as in the above described objects in which successive dispensing can be accomplished semi-automatically and with readout means therefor not requiring resetting and recalibration.

A further object is the provision of such method and apparatus in which repetitive dispensing is semi-automatically accomplished and readout of titration results is automatic.

Still another object is the provision of titration method and apparatus in which successive dispensing for back-titration are accomplished semi-automatically and back-titration results are provided in direct automatic readout.

Another object of the invention is the provision of method and apparatus as in the above described objects in which signal representation can be selectively changed without recalibration of apparatus.

In accordance with the practice of this invention, means are provided for dosing from a titrant reservoir and transferring or metering discrete quantities of the titrant to an unknown sample. Electric signal generating means are linked to the liquid transferring means for providing an analog signal representative of the amount of liquid transferred. Calibration circuits and means for weighting the generated signal to reflect titrant concentration and sample volume permit obtaining direct readout on a display means, such as a digital voltmeter for example, of a titrated sample concentration.

The calibration circuits and means also furnish analog subtraction of the generated signal establishing direct readout of the concentration of a back-titrated sample.

DESCRIPTION OF A PREFERRED EMBODIMENT

Figure 1:
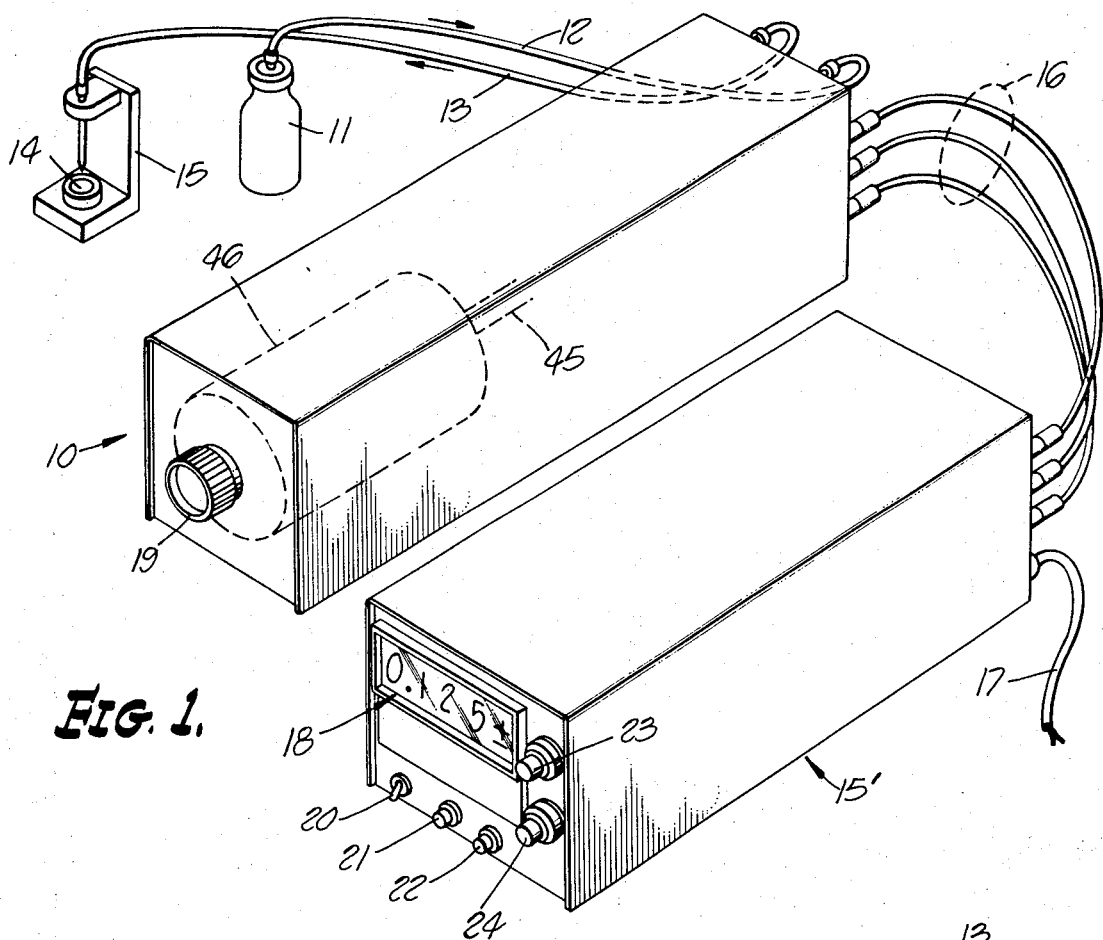
FIG. 1 is a perspective view of the apparatus of the invention illustrating its major components.

Reference is now made to FIG. 1 and the major aspects of the invention which comprise generally a dispensing and electric signal generating means 10 for transferring precise metered amounts of titrant from a supply 11 along tubing 12 and 13 to be added to an unknown sample in a mixing receptacle 14 carried by a suitable support 15 and producing an electric analog signal representative of the amount of liquid transferred. Monitoring and computing apparatus, identified generally as at 15', are related to the unit 10 via cabling 16 and receive energizing power via a further cable 17. Visual display of the liquid volume transferred, the quantity of a liquid constituent transferred, or the constituent concentration of a titrated or back-titrated sample, as the case may be is provided at 18.

Generally as to operation, the entire system is primed with liquid (titrant) so that tubing 12, 13 and associated metering means to be described are filled with the respective liquid. This is accomplished by reciprocally rotating control 19 to the limits of its clockwise and counter clockwise travel, which serves to dose liquid or titrant from the reservoir 11 and prime the entire system. Control 19 then is returned to its threshold position corresponding to that providing maximum internal capacity of the liquid pumping means to be described, after which, with selector switch 20 in its lower position, the zero offset potentiometer control 23 is adjusted for zero readout of 18, after which switch 20 is transferred to its upper reference position and zero offset control 22 is similarly adjusted for zero readout. Next an exact reference volume of liquid or titrant is dispensed by an appropriate increment of clockwise rotation of control 19, which reference volume is measured otherwise than by the instrument and equipment of this invention. Without again moving control 19, reference slope adjust potentiometer control 21 is adjusted so that the value of the above measured volume is displayed at 18. The instrument is now calibrated to display liquid aliquots dispensed in units of volume ($Vt$) at the means 18, when the selector switch is in upper or reference position.

With control 19 in the same position as above, and selector switch 20 transferred to the lower or compute position, the instrument may now be optionally calibrated to: (1) determine the quantity of dispensed liquid constituent by adjusting a slope adjust control 24 so that the value of the expression $Ct \times Vt$ is displayed, where $Vt$ is the volume of the previously dispensed reference aliquot and $Ct$ is the concentration of the liquid constituent; or (2) measure directly the concentration of a titrated sample constituent by adjusting slope control 24 such that the value of the expression $ct/Vs \times Vt$, is displayed at 18, where $Vt$ is the volume of the previously dispensed reference aliquot, $Ct$ is the concentration of the titrant and $Vs$ is the volume of each sample to be subsequently titrated.

An alternate method of calibrating the instrument to automatically meter the concentration of a titrated sample is by: (1) filling the instrument with titrant as previously described; (2) returning control 19 to its threshold position, and with the selector switch 20 in its lower or compute position adjusting the zero offset control 23 so that the display means 18 registers 0.000; (3) titrating a reference sample of known concentration and equal in volume to that of individual samples to be subsequently titrated; and (4) with control 19 in the same position as that reached at the end point of titration of the reference sample, adjusting slope adjust control 24 whereby the value of $Cr$, which is the concentration of the titrated reference solution is displayed.

The apparatus may also be calibrated to compute and display units of concentration of a back-titrated sample by: (1) filling the instrument with titrant as previously described; (2) rotating control 19 to titrate a reference solution aliquot of known concentration and equal in volume to that to which each unknown sample is to be added for back-titration; (3) with control 19 in the same position as that reached at the end point of the above titration, and selector switch 20 in its lower or compute position, adjusting zero offset control until means 18 registers 0.000, and (4) returning control 19 to threshold position and finally adjusting slope adjust control 24 so that the means 18 registers the value ($Vr \times Cr$)/$Vs$, where $Vr$ is the volume of the reference solution titrated, $Cr$ is the concentration of the titrated reference solution and $Vs$ is the volume of sample to be added subsequently to respective volume $Vr$ of reference solution and back titrated. If at first the concentration of the reference solution is unknown, this value may be determined by initially calibrating the instrument to function in its titrimetric mode and titrating the reference solution with a titrant of known concentration. When the above calibration procedures for back-titration are accomplished, and when an appropriate volume of sample is added to an appropriate volume of reference solution and the mixture titrated, the instrument will automatically display the concentration of the unknown added sample at the completion of the titration.

The description in the immediately preceding paragraphs of uses of the apparatus depicted in FIG. 1 has been confined to the manipulative steps with the functional operation being provided hereinbelow in the detailed description of the associated mechanical and electrical apparatus.

Figure 2:
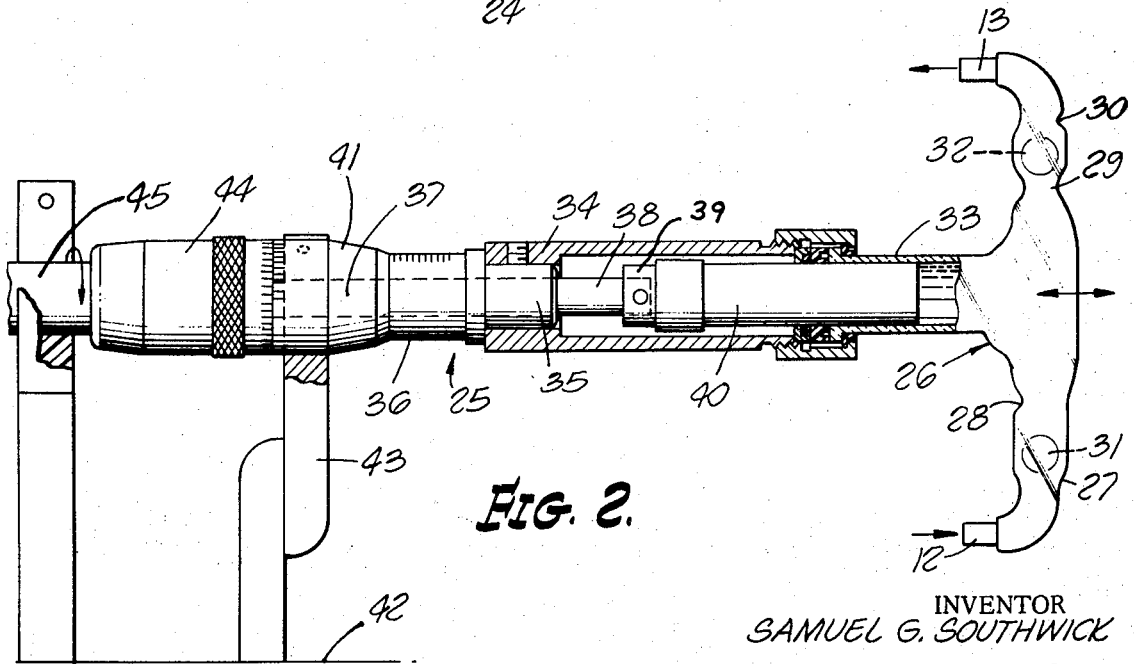
FIG. 2 is an elevational, partially sectional, view of the liquid metering and dispensing apparatus.

FIG. 2 depicts a preferred form of liquid metering or pumping means 25 for use in the invention, comprising a generally T-shaped hollow chamber 26, the arms of which are connected to the tubing 12 and 13, respectively. Each chamber arm includes a pair of constricted portions 27, 28 and 29, 30 for locating valving spheres 31 and 32, respectively.

The chamber 26 further includes a cylindrical portion 33 fixedly mounted by a hollow support 34 on the unthreaded sleeve extension 35 of a precision threaded nut 36. Received within the nut 36 is a similarly precision threaded screw 37, an unthreaded extension 38 of which is received within the sleeve extension 35, and is tandemly connected by means of a rotatable coupling 39 to a plunger 40 slidable within the bore of the cylindrical portion 33 of chamber 26. The nut 36 is translatable within the bore of a collar housing 41 which nut is fixed against rotation therein by a longitudinal rib (not shown) projecting from the internal surface of 41 and received within a corresponding longitudinal groove (not shown) on the external surface of the nut 36. Collar housing 41 is fixedly mounted to a chassis 42 by means of a support 43. The head 44 of the precision threaded screw 37 is affixed to an adjustment shaft 45. It will be understood that equal increments of rotation of shaft 45 result in equal translatory movements of the chamber 26 and its cylindrical extension 33 relative to the plunger 40, and that an adjustment of shaft 45 on rotation serves to advance or recede, as the case may be, support 43, chamber 26 and extension 33 with respect to screw extension 38 and plunger 40, to increase or decrease the volume of liquid contained within the chamber 26.

The orifices 27 and 29 are so dimensioned that the valving spheres when engaging the orifice walls prevent fluid flow. On the other hand, orifices 28 and 30 are of such geometry as to prevent the associated sphere from passing, while allowing fluid to pass. That is, when the cylinder or barrel 33 is moved to the left as shown in FIG. 2, titrant is forced past the sphere 32, and through orifice 30 into output line 13, whereas the valving sphere 31 is closed in orifice 27 and fluid cannot flow back into line 12. When the barrel moves to the right, the reverse valving condition exists, filling the cylinder 33 with titrant and preventing titrant flow to output line 13.

Figure 3:
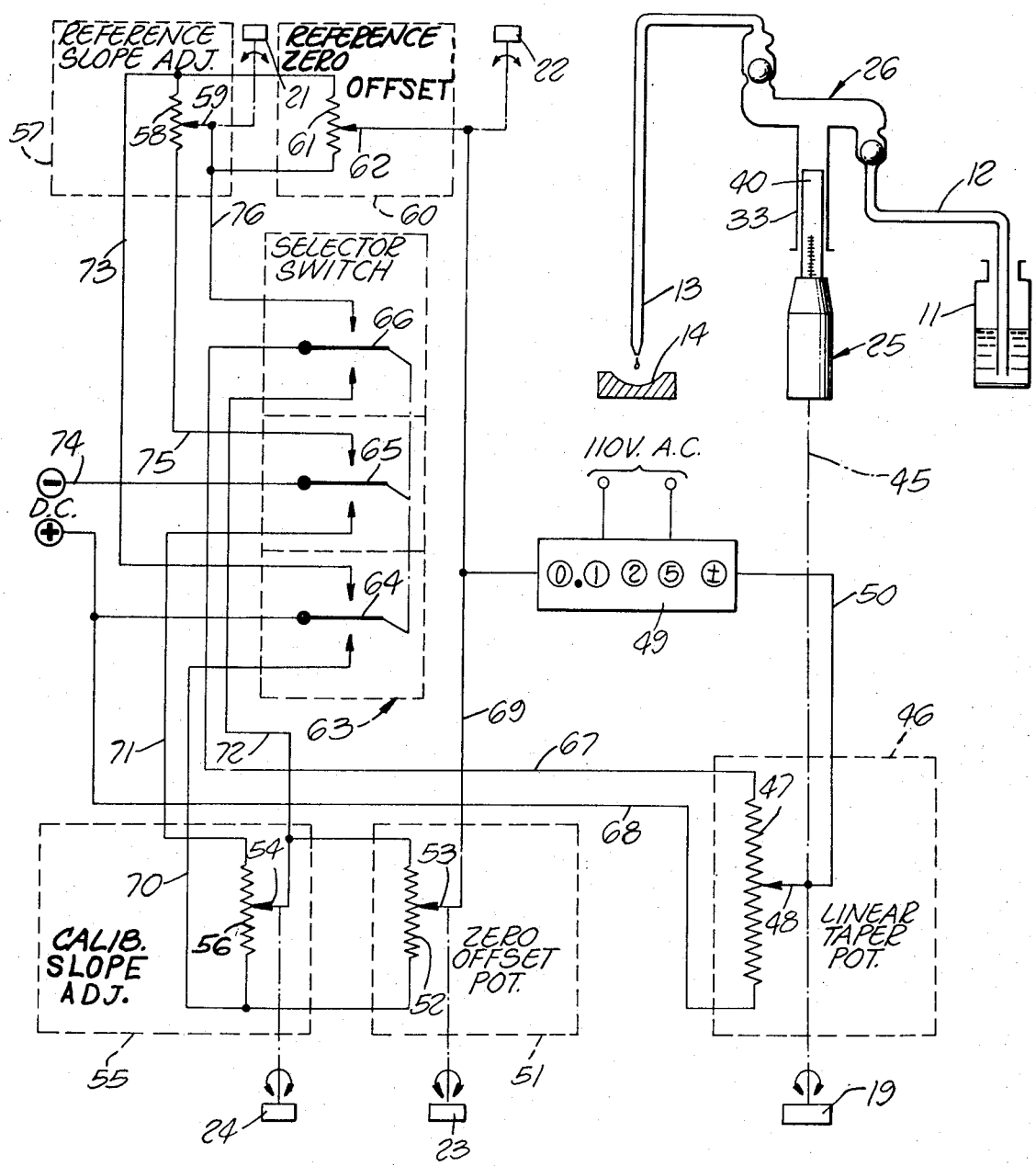
FIG. 3 is a schematic representation of operation of the invention including electrical circuit aspects.

As shown in FIGS. 1 and 3, the shaft 45 is common to the shaft for positioning the adjustable contact or slidewire of a potentiometer 46, which shaft is adjustably positioned by control knob 19 to simultaneously transfer titrant and reset the adjustable contact on the potentiometer resistance to reflect electrically such transfer.

Turning now to the circuit aspects of the invention as depicted in FIG. 3, the potentiometer 46 includes a linear resistance 47 and adjustable slide contact 48, the latter being simultaneously adjusted by control 19 with the dispensing or dosing movement of screw 37, support 43 and chamber 26.

Accordingly, the potential level presented to one side of a digital voltmeter 49 via lead 50 is dependent upon the position of the slidewire 48. A zero offset potentiometer 51 includes a resistance 52 with adjustable slide contact 53 positioned by control knob 23. One end of the resistance 52 is connected to the slide contact 54 of a calibration slope adjust potentiometer 55, the resistance of which is identified as at 56. The other end of the resistance 52 is tied to one end of resistance 56. The calibration potentiometer is adjusted by control 24.

A potentiometer 57 including a resistance 58 and an adjustable contact 59 and identified further as the reference slope adjust is adjusted by the control 21. The potentiometer 60 including resistance 61 with adjustable contact 62 positioned by reference zero offset control 22 has its resistance shunted across contact 59 and one end of resistance 58.

A selector switch assembly 63 includes three separate single-pole, double-throw switches 64, 65 and 66, operated in tandem by the switch arm 20. The selector switch assembly may optionally be a triple-pole, double-throw arrangement.

One end of the linear taper potentiometer resistance 47 is connected to the translatable pole of switch 66 by lead 67, and its other end interconnects with the plus terminal of the D. C. voltage supply and the translatable pole of switch 64 via lead 68. The sliding contact 48 of the potentiometer 46 is connected to one input of the digital voltmeter 49 via lead 50. The zero offset potentiometer sliding contact 53 interconnects with the reference zero offset contact 62 and the remaining input of the digital voltmeter via lead 69. One end of resistance 52 connects with an end of resistance 56, the common of which is also related to the lower fixed pole of switch 64 by lead 70. The other end of resistance 56 is connected to the lower fixed pole of switch 65 via lead 71. The sliding contact 54 connects with the remaining end of resistance 52, which common connection is also related to the lower fixed pole of switch 66 via lead 72. The upper fixed pole of switch 64 is connected to the common terminal of resistances 58 and 61 by lead 73. The translatable pole of switch 65 is tied to the D. C. source negative terminal by lead 74, while the upper fixed pole of this same switch connects with the free end of resistance 58 by lead 75. The remaining end of resistance 61 is connected to the sliding contact 59 and thence to the upper fixed pole of switch 66 by lead 76.

Circuit Operation for Liquid Dispensing and Titrimetry

With the selector switch moved to its lowermost connective aspect, the commoned end of resistance 56 is connected through lead 70 and switch 64 to the positive voltage source terminal, whereas the other end of this same resistance connects through switch 65 to the negative voltage source terminal. Resistance 52 of zero offset potentiometer 51 shunts the commoned end of resistance 56 and the slide contact 54, and, similarly, resistance 47 via switch points 66 shunts the same portion of resistance 56. Accordingly, in the described connective mode, the two legs of the potentiometers 46 and 51 form a Wheatstone bridge with the voltmeter 49 arranged to indicate the degree of bridge imbalance.

The volume of liquid or titrant dispensed is linearly related to the rotational movement of control 19 as is the value of the resistance tapped off 47 by sliding contact 48.

Consequently, if the sliding contact 53 is initially adjusted by means of control 23 to null the bridge (zeroing the readout of the voltmeter 49) at a point corresponding to the threshold position of control 19 and contact 48, subsequent adjustment of control 19 simultaneously dispenses titrant and positions the slide contact 48 to produce an unbalance of the bridge and a resultant voltage potential read by the voltmeter which is proportional to the volume of titrant dispensed.

The voltage applied to the bridge determined by the position of the selectively adjustable contact 54 of the potentiometer 55 is a selectively variable analog multiplier of the bridge output. Accordingly, the potentiometer 55 functions as a slope adjust of the readout, i.e., slope of the linear output.

More particularly, adjustment of calibrating potentiometer 55 calibrates the readout to the voltmeter to display the value of any variable quantity which is a linear function of the volume of titrant dispensed. Accordingly, the readout to the voltmeter may be calibrated to register the value of any of the following quantities: (1) V, the volume of liquid or titrant dispensed; (2) $Ct \times V$, the amount of liquid constituent dispensed, where $Ct$ is the concentration of the constituent in the dispensed liquid; (3) $Ct/Vs \times V$, the concentration of a titrated sample at the end point of a titrant dispensing procedure, where $Ct$ is the concentration of the titrant and $Vs$ is the volume of the titrated sample.

It will be understood by those skilled in the art that the calibrating potentiometer 55 may alternatively be interfaced between the Wheatstone bridge and the voltmeter, or that a variable resistance may be incorporated within the voltmeter to achieve the same calibrating function without departing from the underlying spirit of the invention.

Back Titrimetry

Adjustment of control 23 of zero offset potentiometer 51 to null the bridge and zero the readout of the voltmeter 49 at that point in the travel of control 19 previously reached at the end point of the titration of the reference sample, sets and references the sliding contact 53 to ratio at 52 a resistance which is equal to that tapped off the resistance 47 by the contact 48 and which is therefore linear with the volume of titrant required to titrate the reference sample to the end point. When control 19 is subsequently manipulated to refill the titrant reservoir and to dispense the volume of titrant sufficient to titrate to end point a combined sample containing a volume of sample unknown added to a volume of reference sample equal to that employed in the first or referencing titration, the slide contact 48 is reset and a resistance is tapped off the resistance 47 which is linearly related to the volume of titrant required to titrate to end point the combined reference and unknown sample. The potential difference now existing between the sliding contacts 48 and 53 is proportional to the difference in the volume of titrant required to titrate the reference sample, and that volume of titrant required to titrate a combined aliquot of reference sample and unknown sample.

A subsequent appropriate adjustment of the potentiometer 55 calibrates readout to the voltmeter to register in appropriate units the value of any selective quantity which is a linear function of the volume difference and expressable by the equation $f(V_1-V_2)=k(V_1-V_2)$ where $V_1-V_2$ is the volume difference of the two aforementioned titrations and $k$ is a constant. Referring again to the equation employed in calculating back titrimetric results, $Cs = Ct/Vs \times (V_1-V_2)$, since the value $Ct/Vs$ is a constant during a back titrimetric procedure, it follows that the readout is calibratable to register the value $Cs$, the concentration of the unknown sample at the end point of a back titrimetric procedure.

Memory Reference Circuit

The reference slope adjust potentiometer 57 and the reference zero adjust potentiometer 60 form a memory reference circuit which duplicates the principal circuit already described consisting of calibrating potentiometer 55 and zero offset potentiometer 51. Transferring the selector switch 63 to its upper position by the toggle 20 electrically substitutes the potentiometers 57 and 60 for the potentiometers 51 and 55. Accordingly, by means of this reference circuit, the apparatus may be made to selectively register any one of a pair of liquid characteristics.

Alternate Embodiment

Figure 4:
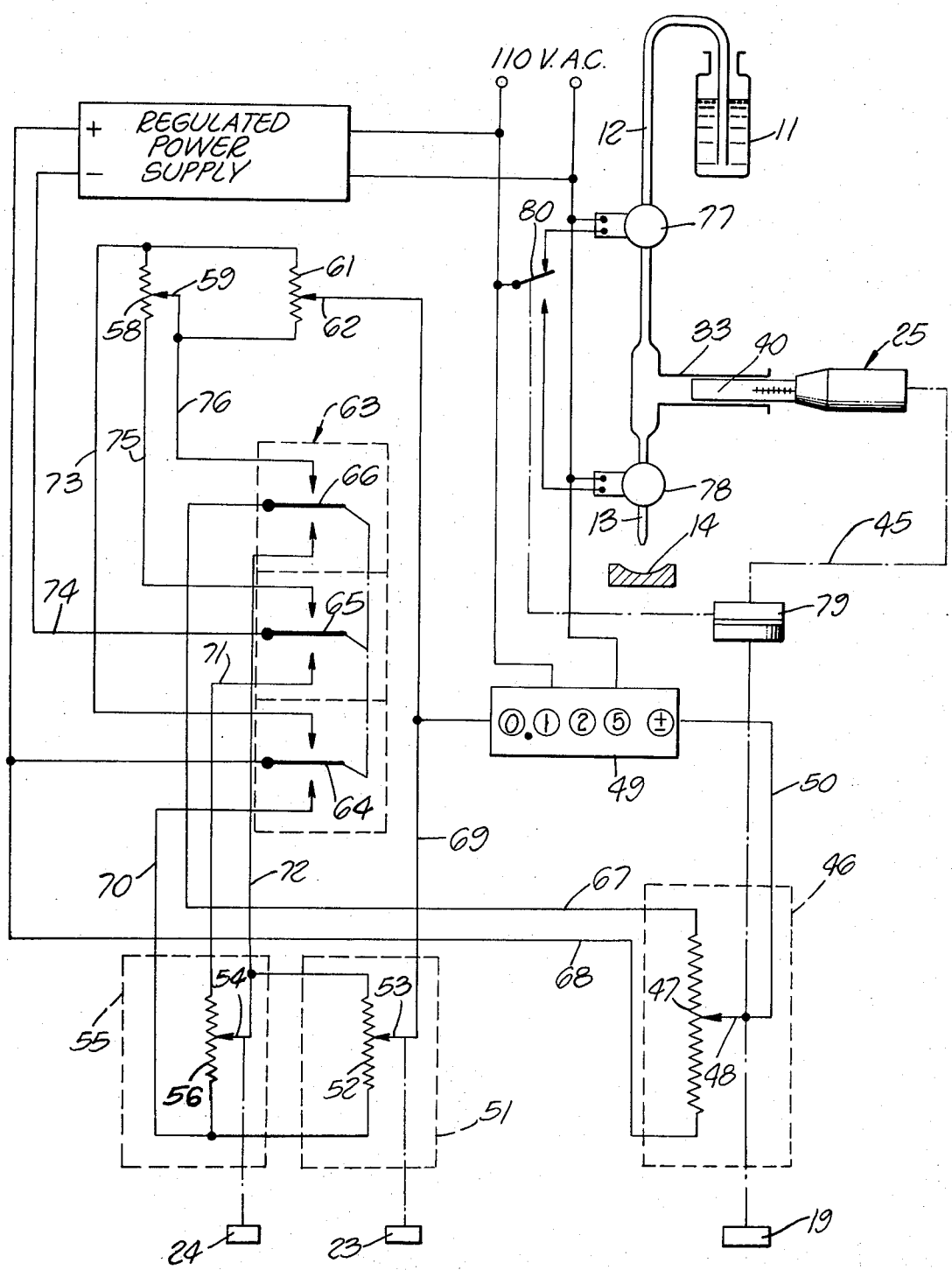
FIG. 4 is a schematic representation of a further form of the invention including solenoid valving.

FIG. 4 illustrates a modified form of the invention which is especially advantageous for handling titrants under hydrostatic pressure. For example, in the previously described apparatus if the titrant container or reservoir were elevated above the general plane of the other equipment, siphon flow of titrant through the equipment could be produced without concomitant adjustment of the control 19, resulting in erroneous readout.

It is to be noted that the major part of the electrical circuits pertaining to computing and dispensing depicted in FIG. 4 are the same as in FIG. 3, and where identical the same reference numerals have been used. In place of the ball check valves, this embodiment utilizes solenoid valves 77 and 78 which are normally closed in the unergized state. A slip clutch 79 driven by the shaft 45 actuates a switch 80 during dispensing rotation thereof to open valve 78 and permit dispensing of titrant. However, as soon as the shaft 45 reverses, switch 80 returns to the position shown in FIG. 4, closing 78 and opening 77.

What is claimed is:

1. Apparatus for transferring liquid titrant from a reservoir to an outlet and indicating liquid quantity transferred, comprising:

conduiting means interconnecting the reservoir and outlet;

pumping means interconnected with said conduiting means including a body member with a cavity interconnected with said conduiting means, piston means disposed within said cavity, and an actuator providing relative translatory movement between the body member and piston means when rotated in a first direction to move titrant from the reservoir, and when rotated in the second direction to move liquid to the outlet;

electric signal generating means including a resistance potentiometer having a slide contact that is secured to said pumping means actuator whereby said slide contact is adjustably positioned on rotation of said actuator for adjusting the electric signal magnitude as a function of actuator rotative movement; and electric signal readout means connected to the signal generating means for providing an indication of liquid amount transferred.

2. Apparatus for transferring a liquid titrant from a reservoir to an outlet and indicating the quantity of titrant transferred, comprising:

conduiting means interconnecting the reservoir with the outlet;

pumping means interconnected with said conduiting means including a body member with a cavity in fluid communicating relation with said conduiting means, piston means disposed within said cavity, and an elongated rodlike actuator providing relative translatory movement between the body member and piston when rotated axially about its long dimension in a first direction to move titrant from the reservoir, and when rotated in the second direction to move liquid to the outlet;

electric signal generating means including a resistance potentiometer having a slide contact secured to said rodlike actuator, which slide contact is adjustably positioned on rotation of said actuator to provide an electric signal of magnitude functionally related to titrant transferred by said pumping means; and means responsive to said electric signal for providing a digital display of units of titrant transferred by said pumping means.

3. Apparatus for transferring liquid from a reservoir to an outlet and providing an indication of liquid quantity transferred, comprising:

liquid conduiting means interconnecting the reservoir and outlet;

pumping means interconnected with the liquid conduiting means, said pumping means including a piston received within a cylinder and threaded drive means rotation of which in a first direction effects relative translation of the piston within the cylinder to transfer liquid toward said outlet from the reservoir;

electric signal generating means including a resistance potentiometer with a slide contact integrally connected with said threaded drive means and adjustably positioned on rotation of said drive means;

first and second electric circuit means of individually selectively adjustable impedance;

switch means selectively actuable to interconnect the potentiometer with the first or second circuit means in a Wheatstone bridge varying the electric signal magnitude per unit of element movement in accordance with the adjustment and connection of said circuit means; and readout means connected to the signal generating means for providing readout indication of liquid amount transferred.

4. Apparatus as in claim 3, in which there are further provided first valving means located in the conduiting means between the pumping means and reservoir, second valving means in the conduiting means located between the pumping means and the outlet, and means for actuating the first and second valving means to opposite states for providing unidirectional liquid transfer.

5. Apparatus as in claim 3, in which said first and second electric circuit means are adjustable to a relative impedance that said readout means provides a direct indication of the concentration of a component material of said liquid transferred.

6. Apparatus for transferring a liquid from a reservoir to an outlet and indicating liquid quantity transferred, comprising:

conduiting means interconnecting the reservoir and outlet;

electrical signal generating means including a resistance potentiometer with adjustable slide contact;

pumping means interconnected with both said conduiting means and said electrical signal generating means, said pumping means including:

a body member with a cavity in fluid communicating relation with said conduiting means, piston means within the cavity, and actuator means for providing relative translatory movement between the body member and the piston means, said actuator means also being connected to the potentiometer slide contact for positioning said slide contact when the actuator is moved in a first direction to move titrant from the reservoir and to adjust the electrical signal output to an initial predetermined value, and when moved in a second direction to transfer titrant to the outlet and to adjust the electrical signal corresponding to the relative translatory motion of the body member and piston means; and electrical signal readout means connected to the electrical signal generating means for providing an indication of liquid amount transferred.

* * * * *